(12) United States Patent
Gu

(10) Patent No.: US 11,969,624 B2
(45) Date of Patent: Apr. 30, 2024

(54) AUXILIARY HANDLE ASSEMBY OF EXERCISE BIKES

(71) Applicant: Haidong Gu, Pomona, CA (US)

(72) Inventor: Haidong Gu, Pomona, CA (US)

(73) Assignee: CYCLINGDEAL USA, INC., Montclair, CA (US)

( * ) Notice: Subject to any disclaimer, the term of this patent is extended or adjusted under 35 U.S.C. 154(b) by 6 days.

(21) Appl. No.: 18/096,566

(22) Filed: Jan. 13, 2023

(65) Prior Publication Data

US 2023/0158365 A1 May 25, 2023

Related U.S. Application Data

(63) Continuation-in-part of application No. 17/179,325, filed on Feb. 18, 2021, now abandoned.

(51) Int. Cl.
*A63B 22/06* (2006.01)

(52) U.S. Cl.
CPC .... *A63B 22/0605* (2013.01); *A63B 2225/093* (2013.01)

(58) Field of Classification Search
None
See application file for complete search history.

(56) References Cited

U.S. PATENT DOCUMENTS

| 5,224,396 A | * | 7/1993 | Lobbezoo | B62K 21/125 74/551.8 |
| 6,003,405 A | * | 12/1999 | Giard | B62K 21/125 74/551.8 |
| 10,759,495 B2 | * | 9/2020 | Vandermolen | B60T 7/085 |

FOREIGN PATENT DOCUMENTS

| TW | 334813 U | * | 6/2008 |
| TW | 345770 U | * | 12/2008 |

* cited by examiner

*Primary Examiner* — Vicky A Johnson

(57) ABSTRACT

An auxiliary handle assembly for an exercise bike includes an extension handle, a first clamp, a second clamp, a first positioning unit, a second positioning unit, a grip and a bar end. The auxiliary handle assembly is removably mounted to the handlebar of the exercise bike. The user holds the grip and contacts the bar end to feel like holding a bicycle handlebar.

7 Claims, 11 Drawing Sheets

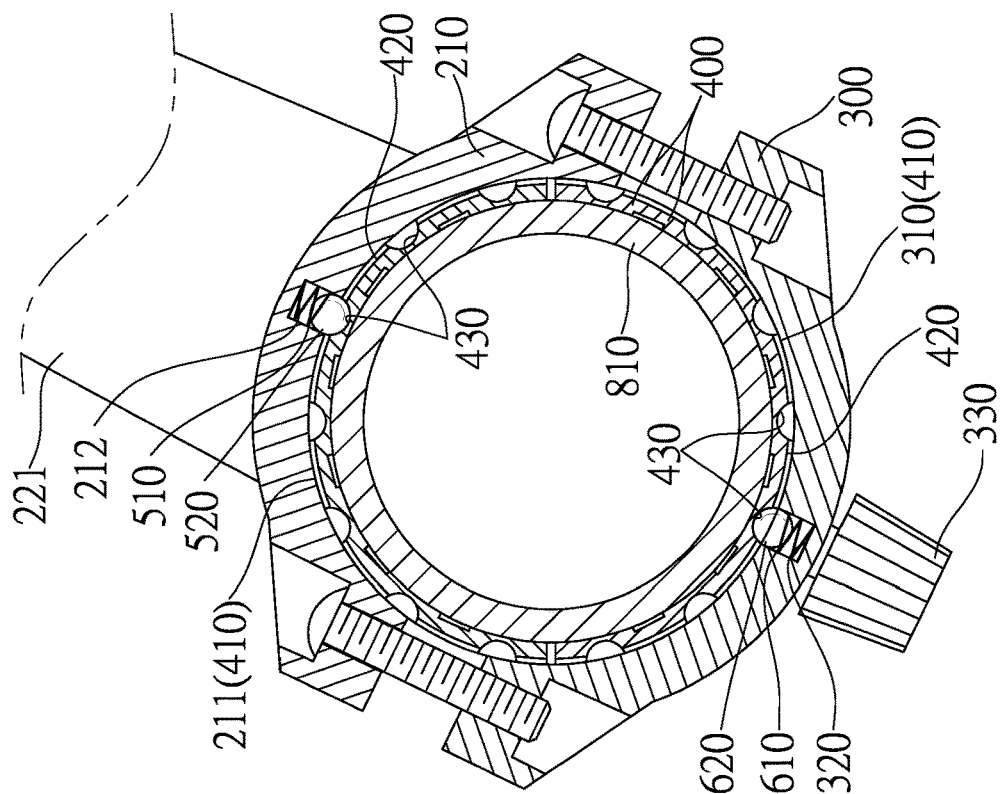
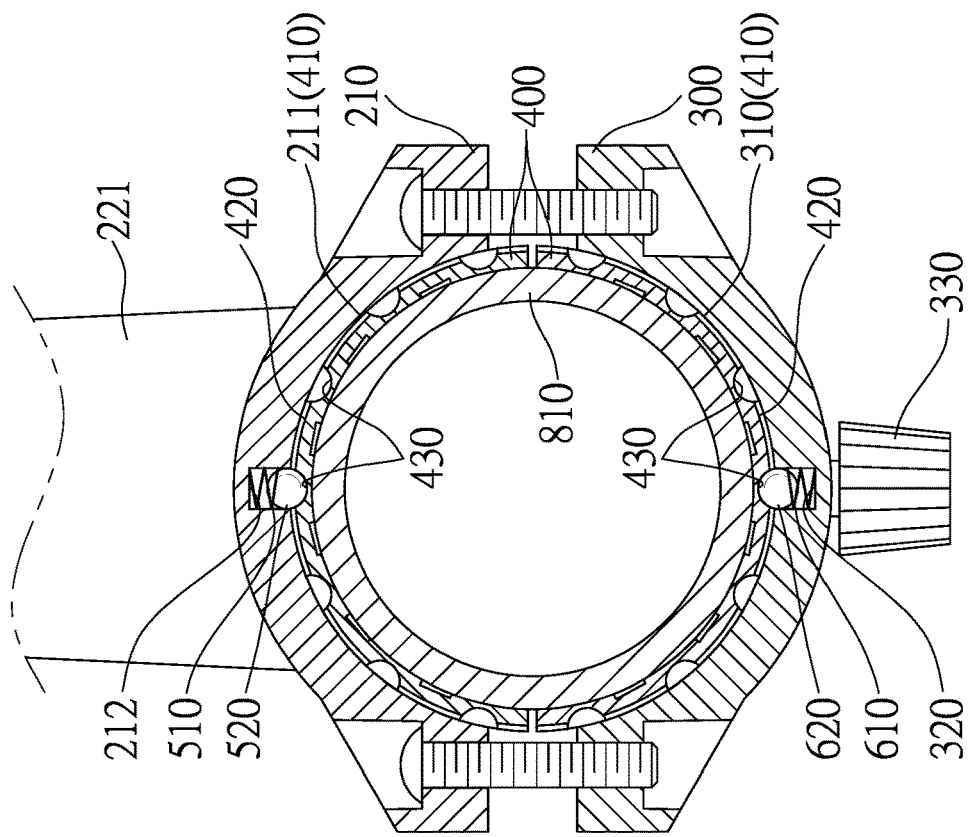
FIG.8B
FIG.8A

AUXILIARY HANDLE ASSEMBY OF EXERCISE BIKES

BACKGROUND OF THE INVENTION

1. Fields of the Invention

The present invention is a Continuation-In-Part patent application of applicant's former patent application with the application Ser. No. 17/179,325, filed on Feb. 18, 2021.

2. Descriptions of Related Art

The auxiliary handle as disclosed in U.S. patent application Ser. No. 17/179,325 is a handlebar that is movably mounted on a handle of an exercise bike to simulate a bicycle handlebar. The exercise bikes as disclosed in Taiwanese Utility Number M562142, M598171, Taiwanese Patent Number 1587890, CN210384705U, CN209596488U and CN107029393B, disclose a handle that can be adjusted its height so that different users can comfortably operate the exercise bikes. However, the handles as mentioned above generally includes a foam sleeve which makes slippery of the user's hands, especially when sweats attached to the users' hands. Some of the users are used to grip a bicycle handlebar rather than the handle of the exercise bike.

The present invention intends to provide an auxiliary handle assembly for an exercise bike to eliminate the shortcomings mentioned above.

SUMMARY OF THE INVENTION

The present invention relates to an auxiliary handle assembly for an exercise bike, and comprises an extension handle including a first section, a second section and a bent section which is connected between the first and second sections. The first section has the first end which is a connection end connected to one of two ends of the bent section, and the second end of the first section is connected to a first clamp. The first clamp includes a first curved face formed to the underside thereof. Two first recesses are defined in the first curved face. The second section has a first portion and a second portion, wherein the first portion has the first end thereof connected to another one of the two ends of the bent section. The second portion is formed to the second end of the first portion.

A second clamp includes a second curved face formed to a top thereof. The second curved face faces the first curved face. Two second recesses are defined in the second curved face. Multiple bolts extend through the second clamp and are connected to the first clamp.

Two plates are two curved plates and located between the first and second curved faces. Each plate includes two grooves formed to the outer face thereof. Multiple notches are located in the inner bottom of each groove.

Two first positioning units each include a first resilient member and a first bead. The first resilient members are respectively located in the two first recesses and bias the two first beads. The two first beads are respectively engaged with the notches of the two grooves of the plate whose outer face faces the first clamp.

Two second positioning units each include a second resilient member and a second bead. The second resilient members are respectively located in the two second recesses and bias the two second beads. The two second beads are respectively engaged with the notches of the grooves whose outer face faces the second clamp.

A grip is mounted to the first portion of the second section. A bar end is connected to the second portion of the second section.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 8A is a cross sectional view, taken along lines of FIG. 6;

FIG. 8B is a cross sectional view, taken along lines of FIG. 8A;

DETAILED DESCRIPTION OF THE PREFERRED EMBODIMENT

Figure 1:
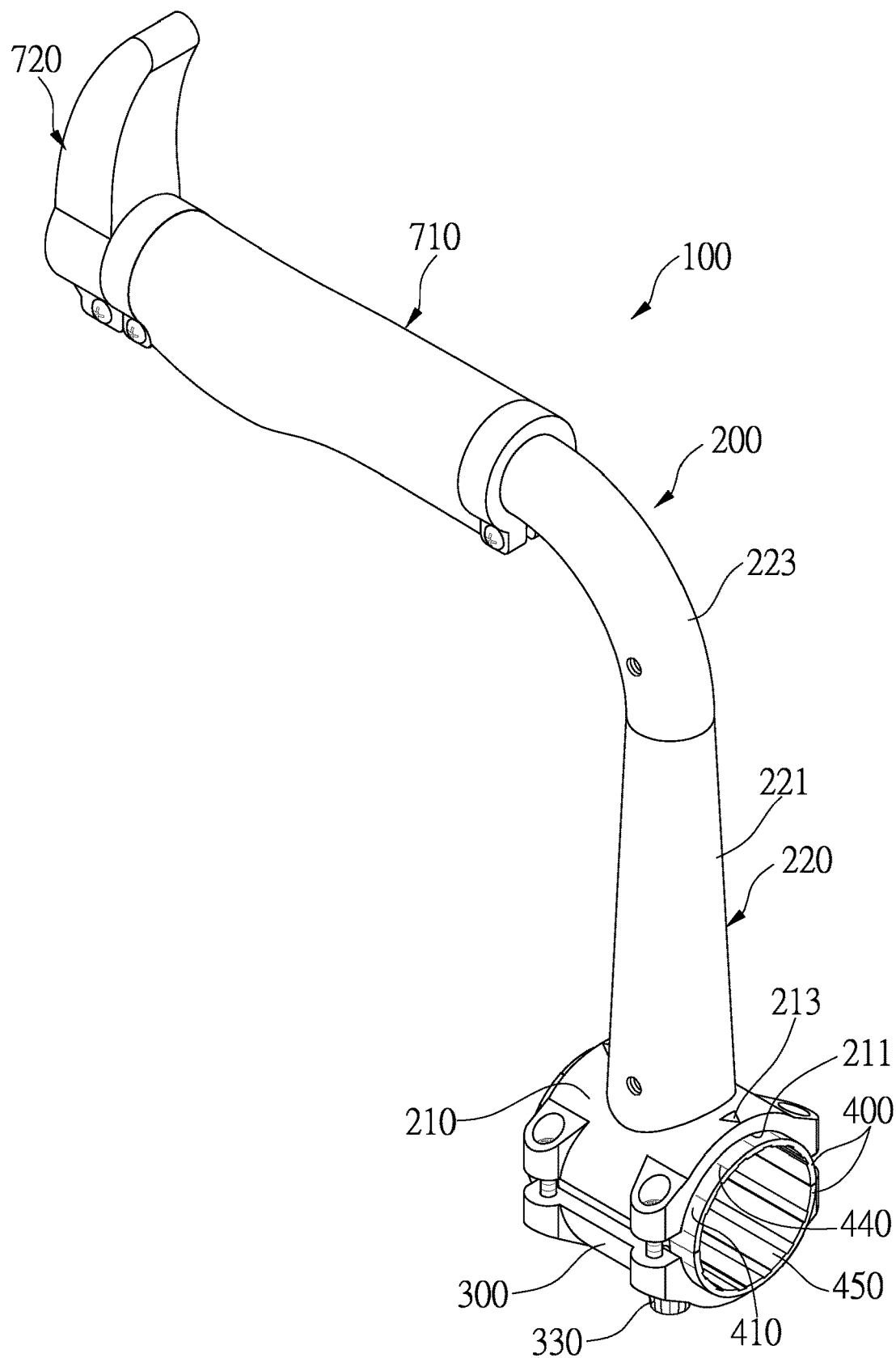
FIG. 1 is a perspective view to show the auxiliary handle assembly of the present invention.

Referring to FIGS. 1 to 9, the auxiliary handle assembly 100 for an exercise bike of the present invention comprises an extension handle 200 including a first section 220, a second section 222 and a bent section 223. The bent section 223 is connected between the first and second sections 220, 222. The first section 220 has a first end that is a connection end 221 and is connected to one of two ends of the bent section 223, and a second end of the first section 220 is connected to a first clamp 210. The first clamp 210 includes a first curved face 211 formed to the underside thereof. Two first recesses 212 are defined in the first curved face 211. The second section 222 has a first portion 224 and a second portion 225. The first portion 224 has a first end thereof connected to another one of the two ends of the bent section 223, and the second portion 225 is formed to the second end of the first portion 224.

A second clamp 300 includes a second curved face 310 formed to the top thereof. The second curved face 310 faces the first curved face 211. Two second recesses 320 are defined in the second curved face 310. Multiple bolts extend through the second clamp 300 and are connected to the first clamp 210.

Two plates 400 are two curved plates and located between the first and second curved faces 211, 310. Each plate 400 includes two grooves 420 formed to the outer face 410 thereof. Multiple notches 430 are located in the inner bottom of each groove 420.

Two first positioning units 500 each include a first resilient member 510 and a first bead 520. The first resilient members 510 are respectively located in the two first recesses 212, and bias the two first beads 520. The two first beads 520 are respectively engaged with the notches 430 of the two grooves 420 of the plate 400 whose outer face 410 faces the first clamp 210.

Two second positioning units 600 each include a second resilient member 610 and a second bead 620. The second resilient members 610 are respectively located in the two second recesses 320, and bias the two second beads 620. The two second beads 620 are respectively engaged with the notches 430 of the grooves 420 whose outer face 410 faces the second clamp 300.

A grip 710 is mounted to the first portion 224 of the second section 222. A bar end 720 is connected to the second portion 225 of the second section 222. The grip 710 includes an end portion 711 and a grip portion 712. The grip portion 712 is made of rubber and secured to the end portion 711.

The extension handle 200 is an L-shaped extension handle and the diameter of the extension handle 200 is the same as a bicycle handlebar. A user can choose desired grip 710 and the bar end 720.

Figure 2:
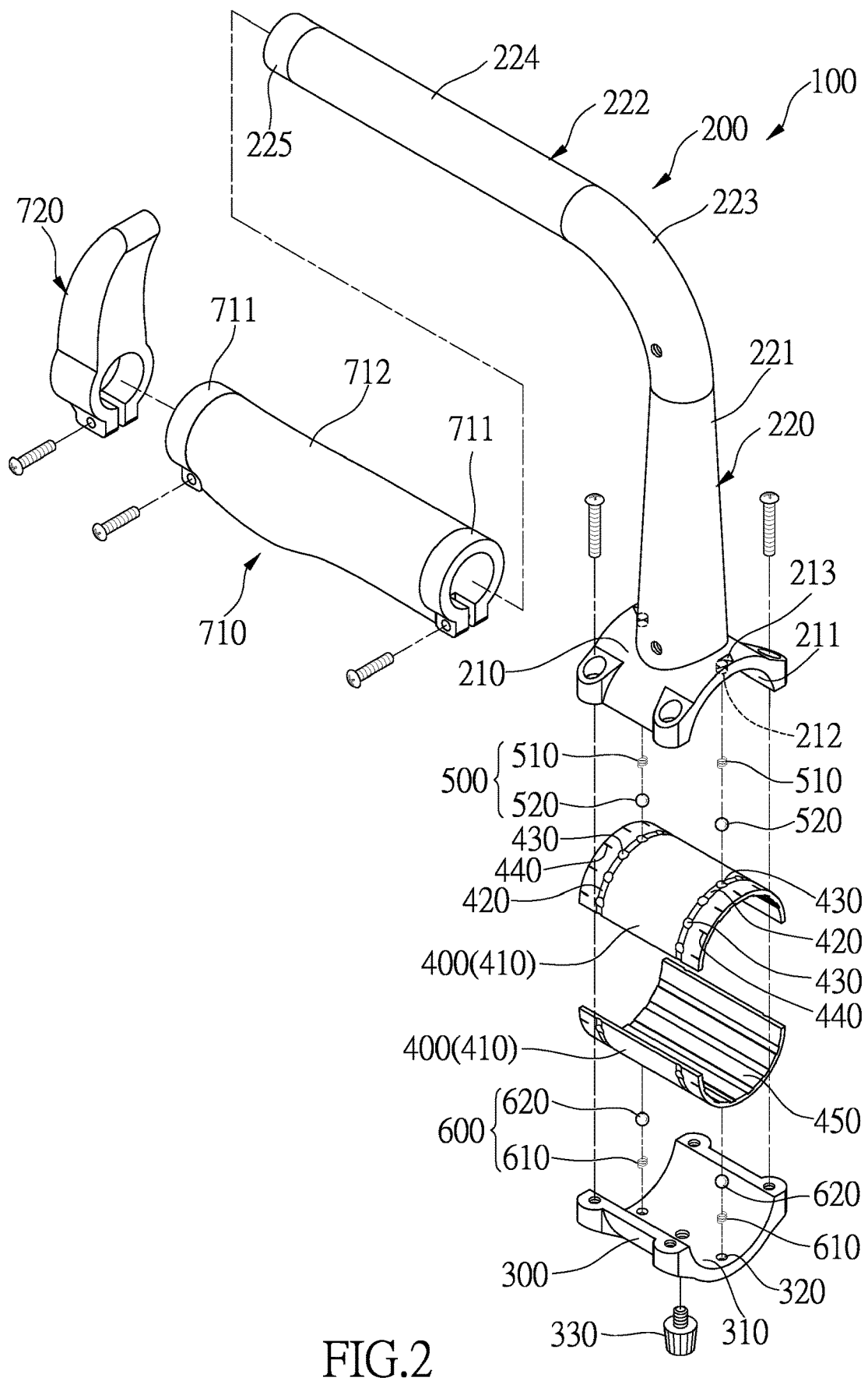
FIG. 2 is an exploded view of the auxiliary handle assembly of the present invention.

As shown in FIGS. 1 and 2, the connection end 221 of the first section 220 is a tapered section. The diameter of the first section 220 is increased toward second end of the first section 220. It is understood that the tapered section of the connection end 221 reinforces structural strength of the first section 220.

Figure 7:
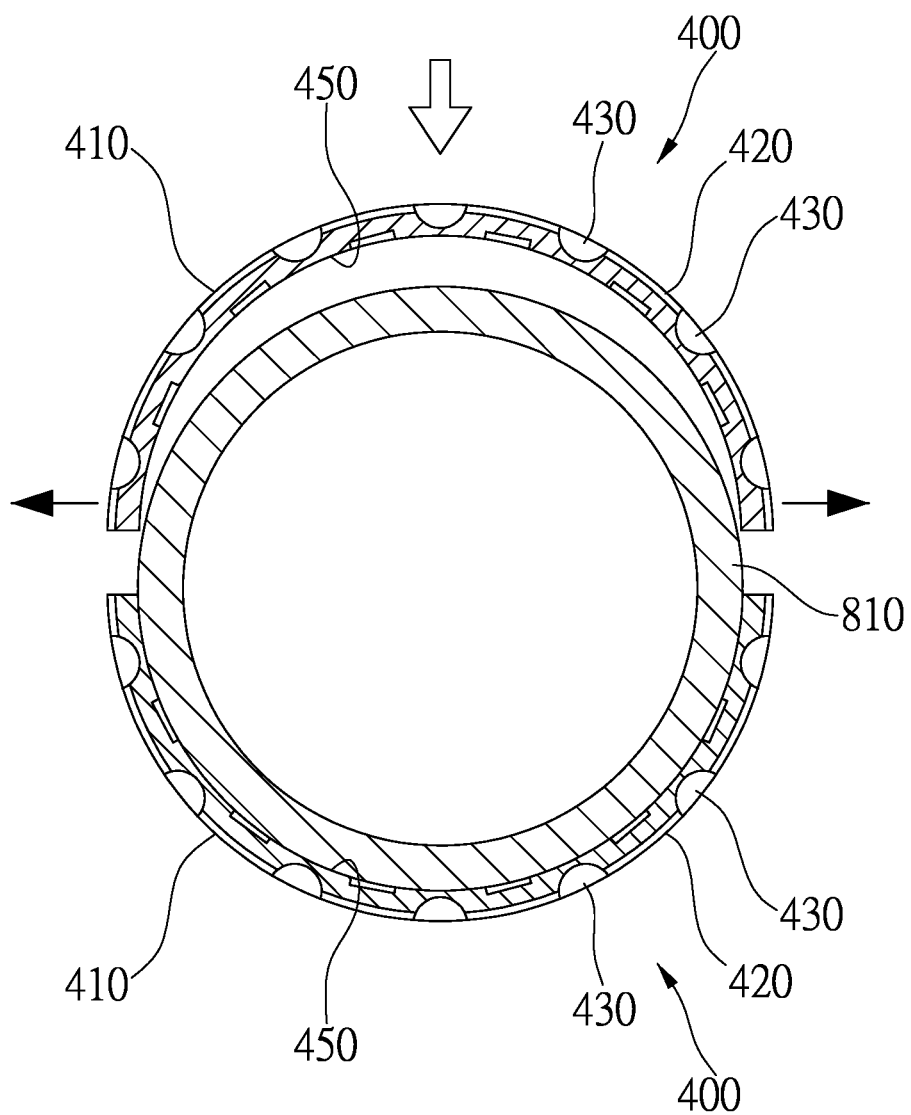
FIG. 7 shows that the two plates are mounted to the exercise bike handlebar.
Figure 9:
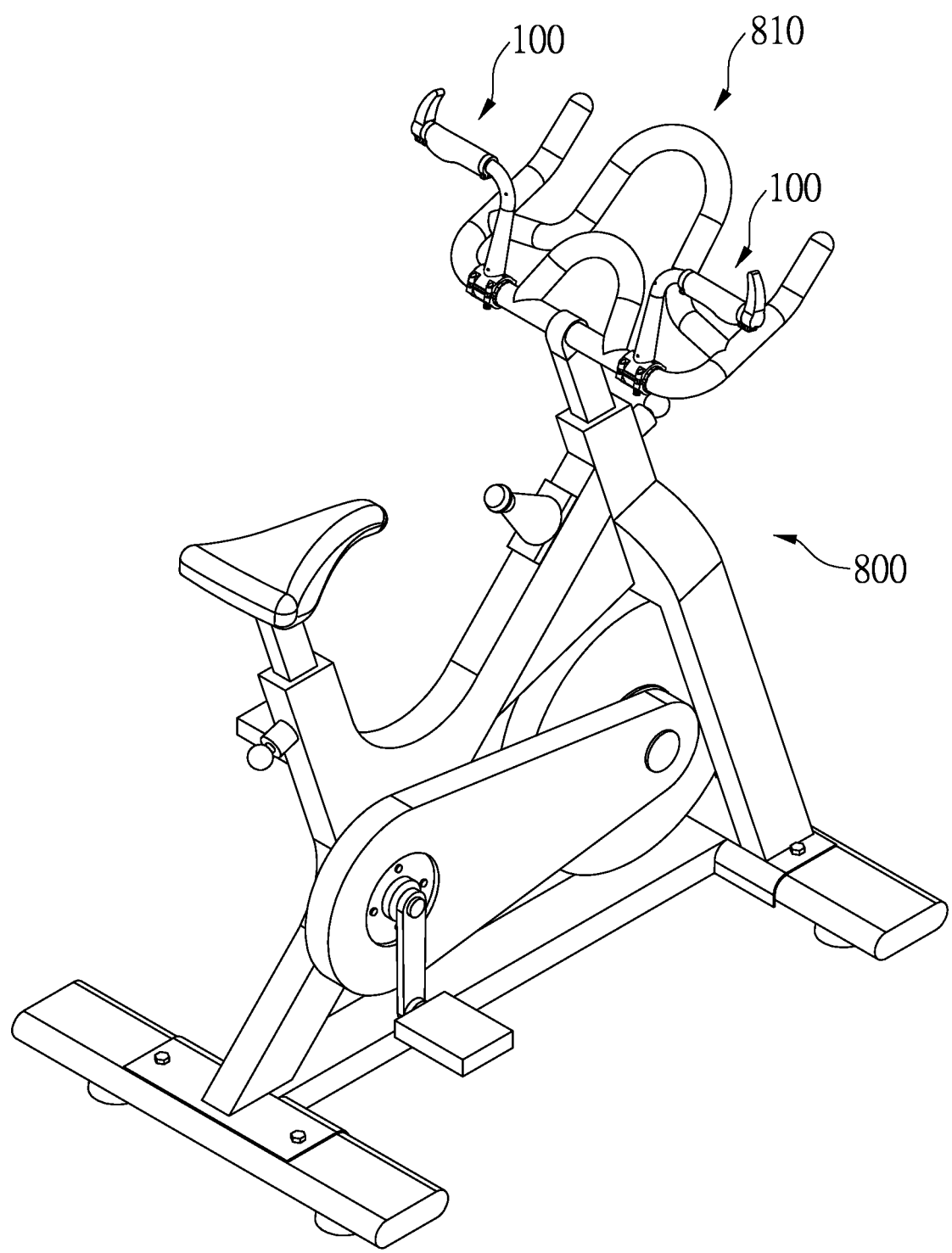
FIG. 9 is a perspective view to show the two auxiliary handle assemblies of the present invention are connected to the exercise bike.

The two plates 400 are mounted to the handlebar 810 of an exercise bike 800 and do not drop from the handlebar 810. The radial size of each plate 400 is slightly smaller than that of the handlebar 810 so that the two plates 400 are slightly expanded outward and are mounted to the handlebar 810. Therefore, the two plates 400 do not drop from the handlebar 810 as shown in FIG. 7.

In addition, each of the two plates 400 includes an inner face 450 which is a non-continuous smooth surface. In this embodiment, multiple ridges and grooves are formed in the inner face 450 so that the friction between the plates 400 and the handlebar 810 assists the two plates 400 to be mounted to the handlebar 810 as shown in FIG. 7. Especially when the handlebar 810 is coated with a foam sleeve, the ridges and grooves of the inner face 450 of each plate 400 are able to firmly hold the foam sleeve.

Figure 3:
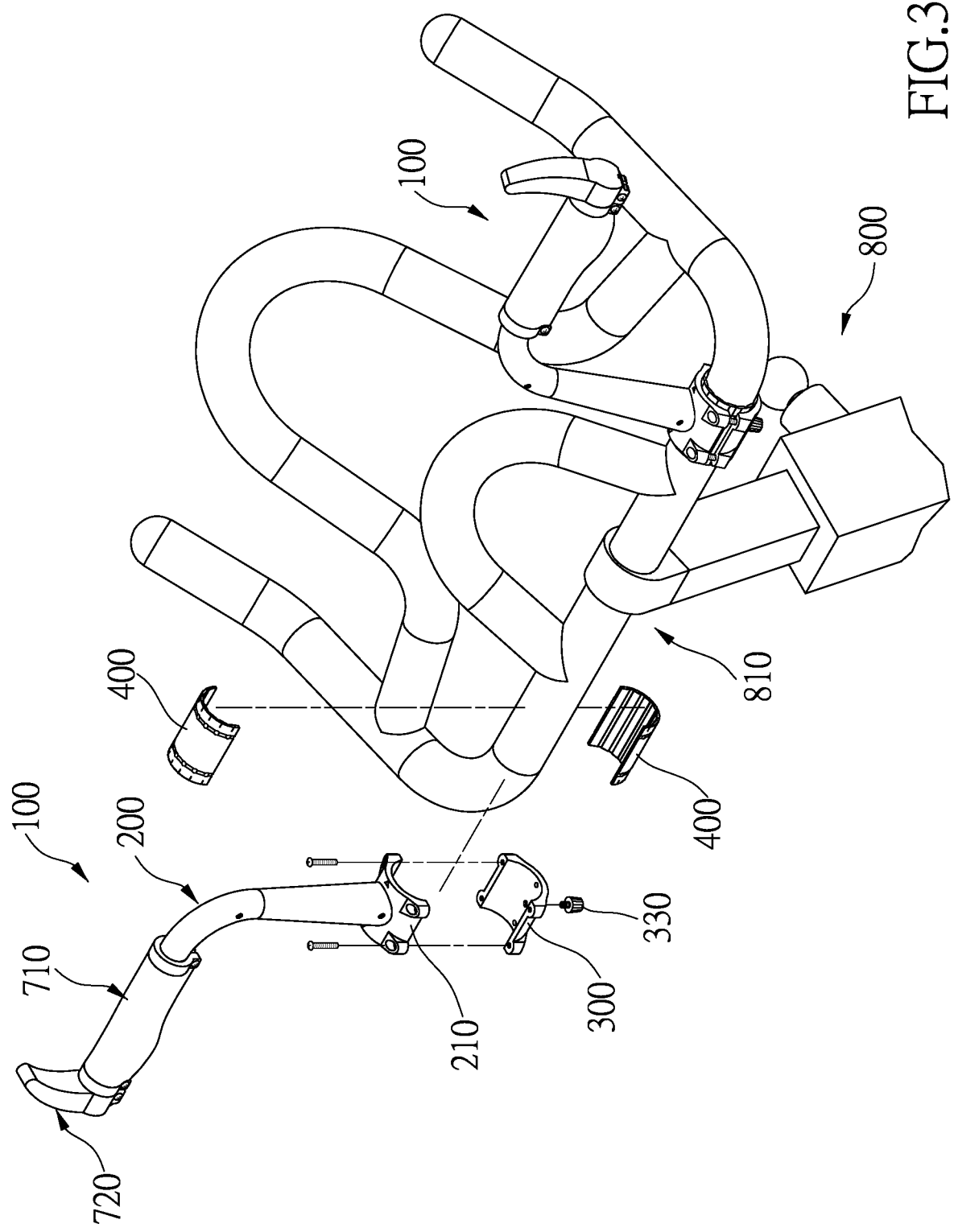
FIG. 3 is an exploded view of the auxiliary handle assembly of the present invention and the exercise bike handlebar.
Figure 4:
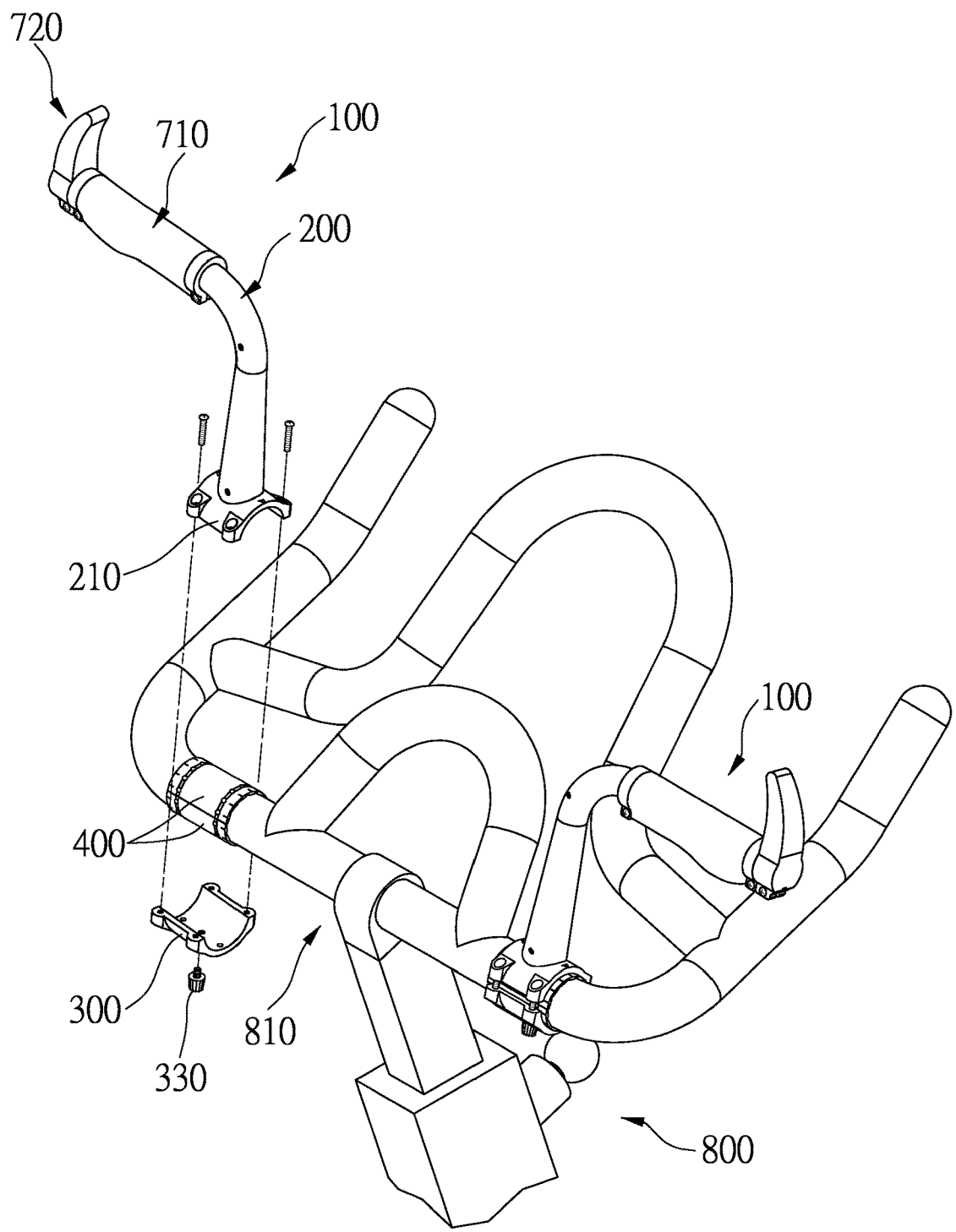
FIG. 4 is another exploded view of the auxiliary handle assembly of the present invention and the exercise bike handlebar.
Figure 5:
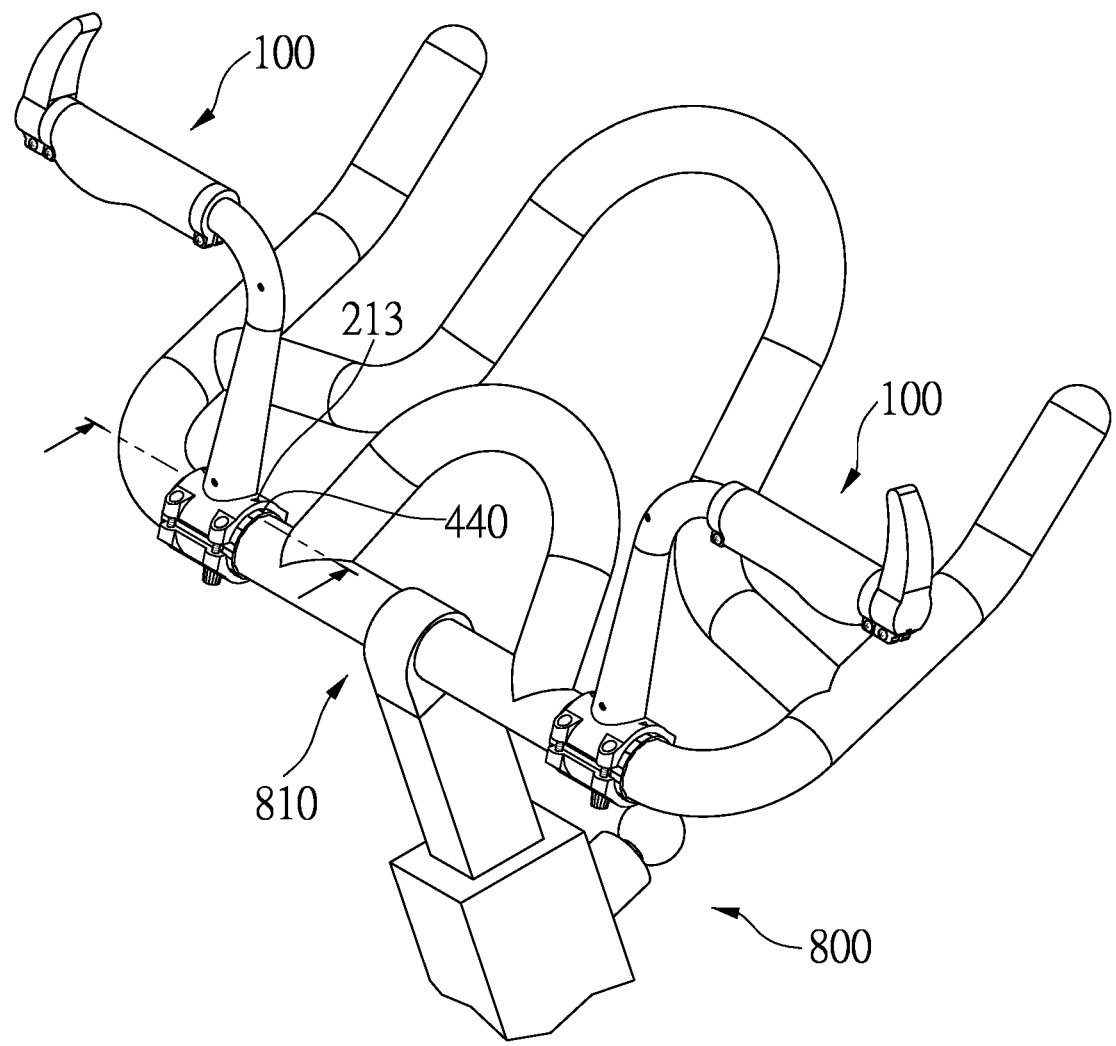
FIG. 5 is a perspective view to show the two auxiliary handle assemblies of the present invention are connected to the exercise bike handlebar.
Figure 6:
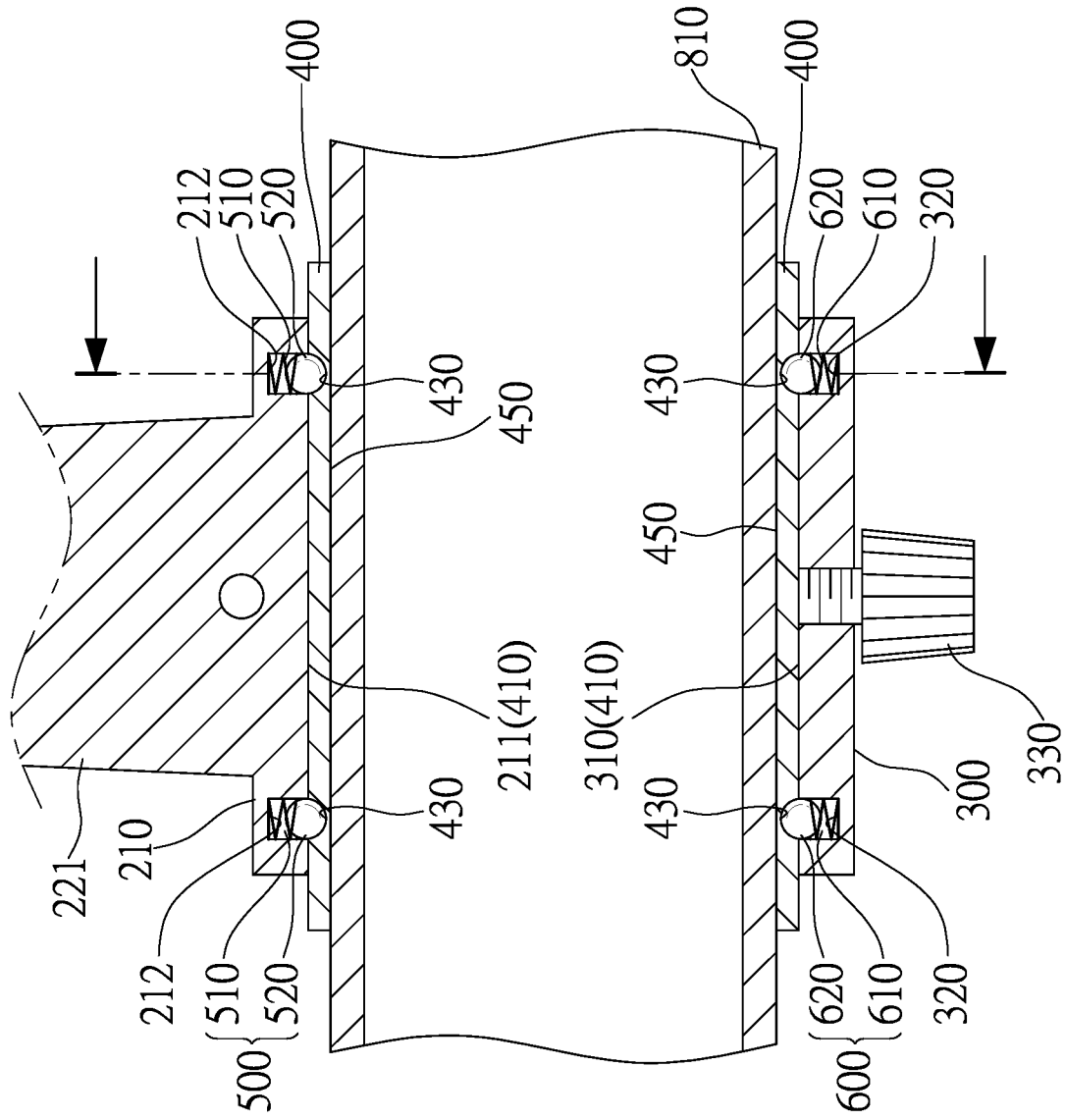
FIG. 6 is a cross sectional view to show the operation of the first and second positioning units.

As shown in FIGS. 2, 3 and 6, a locking member 330 extends through the second clamp 300 and contacts against the outer face 410 of the plate 400 that faces the second clamp 300 to prevent the extension handle 200 and the second clamp 300 from movement relative to the plates 400.

As shown in FIG. 2, two sides of each plate 40 protrude beyond the first and second clamps 210, 300. Each plate 400 includes multiple marks 440 formed to the two sides of the outer face 410 thereof. The first clamp 210 includes an index 213 which points one of the marks 440.

When adjusting the angle of the extension handle 200 forward or backward, as shown in FIGS. 8A and 8B, the locking member 330 is loosened, the extension handle 200 and the second clamp 300 are pivoted relative to the plates 400, so that the first and second curved faces 211, 310 slide along the two respective outer faces 410 of the two plates 400. Each of the first beads 520 removes from the notch 430 and moves along the groove 420 until the first bead 520 is engaged with another notch 430. Similarly, each of the second beads 620 removes from the notch 430 and moves along the groove 420 until the second bead 620 is engaged with another notch 430. The locking member 330 is tightened again to set the adjusted angle of the extension handle 200.

The first and second beads 520, 620 are respectively biased by the first and second resilient members 510, 610, when the first and second beads 520, 620 are engaged with the notches 430, the user is acknowledged by the change of force applied to the first and second beads 520, 620. The notches 430 are defined in the inner bottom of the groove 420 corresponding thereto, and the outer face 410 of each plate 400 is a curved face, so that the angle adjustment can be smoothly operated and there are multiple angular positions to be set.

The marks 440 are made corresponding to the positions of the notches 430, the user can directly check the index 213 and the mark 440 to know the angle that the extension handle 200 is adjusted. In other words, after the horizontal positon of the handlebar 810 of the exercise bike 800 is set, the user can easily check the angular position of the extension handle 200 of the present invention.

Figure 10:
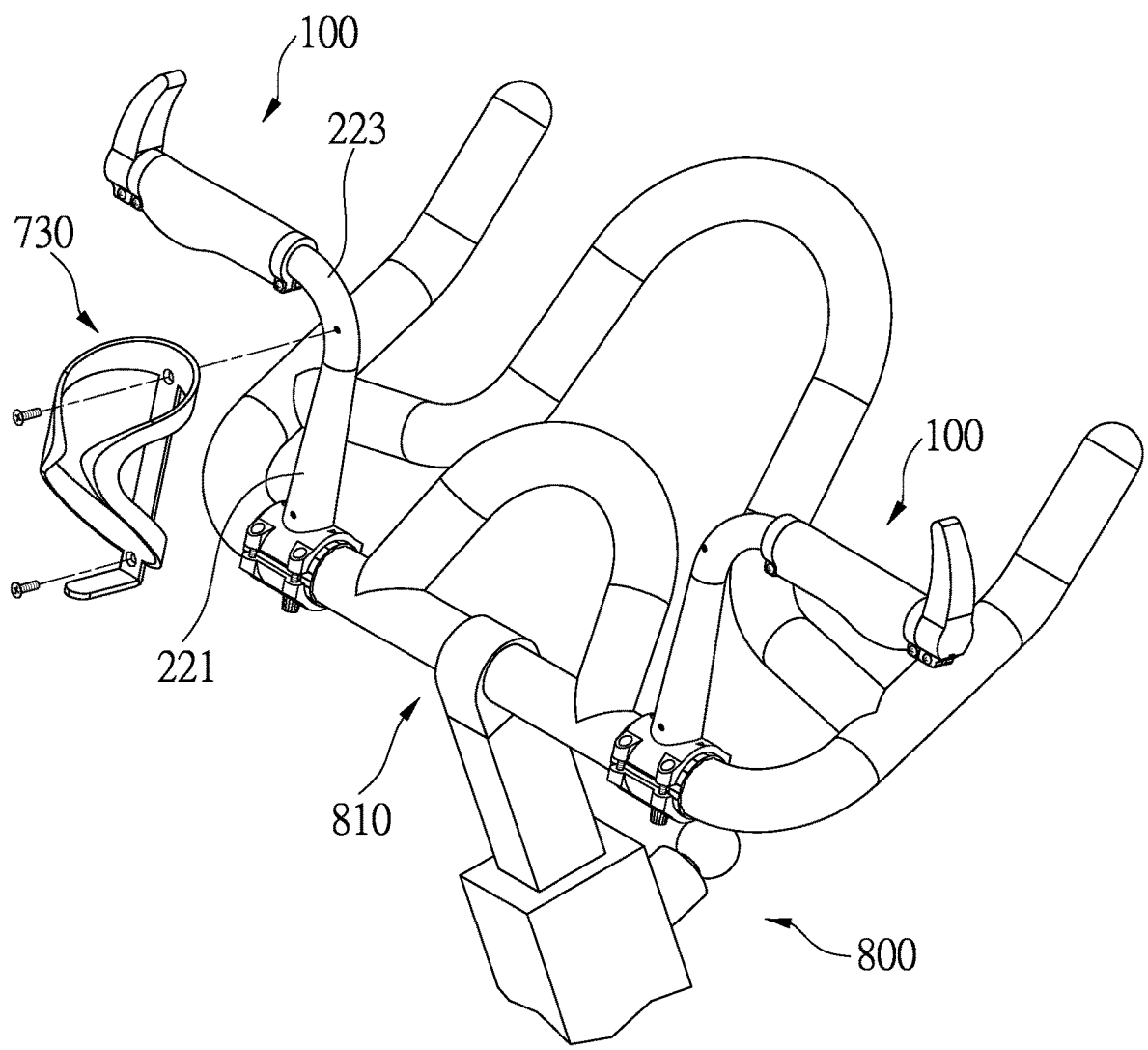
FIG. 10 shows a water bottle frame is to be connected to the auxiliary handle assembly of the present invention, and FIG. 11 a water bottle is to be put in the water bottle frame.
Figure 11:
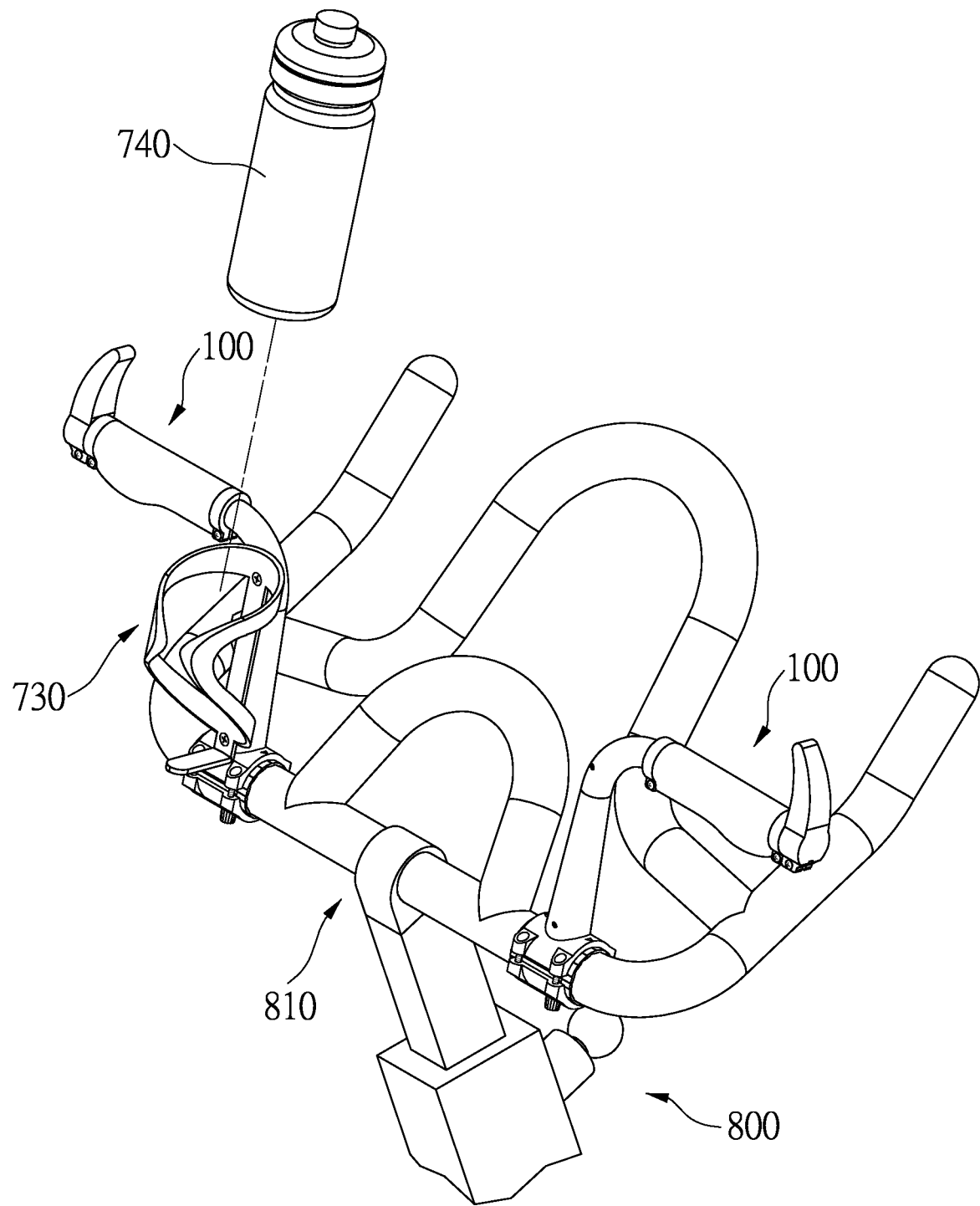

As shown in FIGS. 10 and 11, a water bottle frame 730 is connected to the connection end 221 and the bent section 223 by extending multiple screws through the water bottle frame 730 and connected to the connection end 221 and the bent section 223. A water bottle 740 can be put in the water bottle frame 730.

While we have shown and described the embodiment in accordance with the present invention, it should be clear to those skilled in the art that further embodiments may be made without departing from the scope of the present invention.

What is claimed is:

1. An auxiliary handle assembly for an exercise bike, comprising:
    an extension handle including a first section, a second section and a bent section which is connected between the first and second sections, the first section having a first end which is a connection end connected to one of two ends of the bent section, a second end of the first section connected to a first clamp, the first clamp including a first curved face formed to an underside thereof, two first recesses defined in the first curved face, the second section having a first portion and a second portion, the first portion having a first end thereof connected to another one of the two ends of the bent section, the second portion formed to a second end of the first portion;
    a second clamp including a second curved face formed to a top thereof, the second curved face facing the first curved face, two second recesses defined in the second curved face, multiple bolts extending through the second clamp and connected to the first clamp;
    two plates being two curved plates and located between the first and second curved faces, each plate including two grooves formed to an outer face thereof which is a curved face, multiple notches located in an inner bottom of each groove;
    two first positioning units each including a first resilient member and a first bead, the first resilient members respectively located in the two first recesses and bias the two first beads, the two first beads respectively engaged with the notches of the two grooves of the plate whose outer face faces the first clamp;
    two second positioning units each including a second resilient member and a second bead, the second resilient members respectively located in the two second recesses and bias the two second beads, the two second beads respectively engaged with the notches of the grooves whose outer face faces the second clamp;

a grip mounted to the first portion of the second section, and a bar end connected to the second portion of the second section.

2. The auxiliary handle assembly as claimed in claim 1, wherein two sides of each plate protrude beyond the first and second clamps, each plate includes multiple marks formed to the two sides of the outer face thereof, the first clamp includes an index which points one of the marks.

3. The auxiliary handle assembly as claimed in claim 1, wherein each of the two plates includes an inner face which is a non-continuous surface.

4. The auxiliary handle assembly as claimed in claim 1, wherein a locking member extends through the second clamp and contacts against the outer face of the plate that faces the second clamp to prevent the extension handle and the second clamp from movement relative to the plates.

5. The auxiliary handle assembly as claimed in claim 1, wherein the connection end of the first section is a tapered section, a diameter of the first section is increased toward second end of the first section.

6. The auxiliary handle assembly as claimed in claim 1, wherein a water bottle frame is connected to the connection end and the bent section by extending multiple screws through the water bottle frame and connected to the connection end and the bent section.

7. The auxiliary handle assembly as claimed in claim 1, wherein the grip includes an end portion and a grip portion, the grip portion is made of rubber and secured to the end portion.

\* \* \* \* \*